J. STEPHENSON.

STREET-CAR.

No. 7,177. Reissued June 13, 1876.

Witnesses
L. Van Riswick
D. G. Stuart

Inventor.
John Stephenson
per S. Hanway
Atty.

N. PETERS, PHOTO-LITHOGRAPHER, WASHINGTON, D. C.

UNITED STATES PATENT OFFICE.

JOHN STEPHENSON, OF NEW YORK, N. Y.

IMPROVEMENT IN STREET-CARS.

Specification forming part of Letters Patent No. 61,482, dated January 22, 1867; reissue No. 6,696, dated October 11, 1875; reissue No. 6,987, dated March 7, 1876; reissue No. 7,177, dated June 13, 1876; application filed May 5, 1876.

DIVISION $E^9$.

*To all whom it may concern:*

Be it known that I, JOHN STEPHENSON, of New York, in the county of New York and State of New York, have invented certain new and useful Improvements in Street-Cars; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
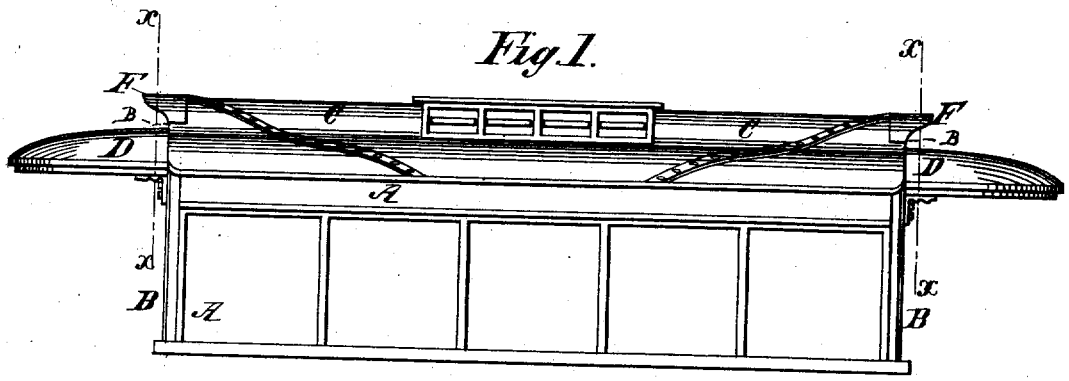
Figure 2:
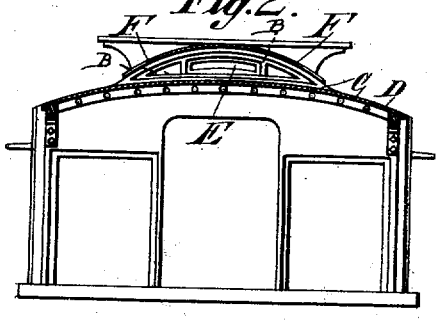
Figure 3:
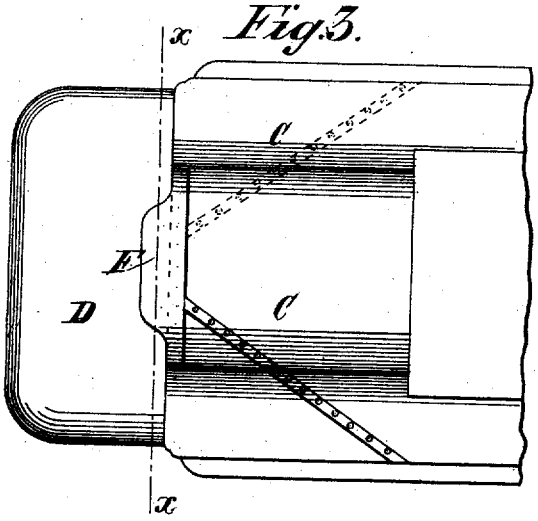

Figure 1 represents a side elevation of the upper portion of the body of a street-car to which my improvement has been applied; and Fig. 2, a cross-section of the same, looking toward the body of the car. Fig. 3 represents a plan or top view of a portion of the same car, showing the relation of the roof-extension to the end of the car.

A street-car with the end of the ridge of the car-roof so constructed as not to extend beyond the end wall, which is covered by the ridge-roof, and which has, below the plane of the ridge-roof, another or inferior roof, and the roofs of two planes connected by a wall, in which is a device for ventilation, light, signal, or other purpose, exposes passengers to the sun's rays, rain, snow, and other inconveniences.

My improvement provides a remedy by extending the ridge-roof over the connecting-wall sufficiently far to form a frontlet for shelter, or screen to protect the end ventilating or signaling device, as the case may be.

The body A of the car and its roof C may be of any of the usual forms, though I prefer the cross-section to be of turtle-back shape, which gives to the ridge a prominent elevation. I also prefer that the ridge part of the roof should be coterminous with the body. I make the central or ridge portion of the roof toward the end at a lower plane, so that the ridge-line of the central post of the roof is at a higher plane than the end posts. A wall, B, having more or less elevation, connects the upper and lower roofs, the upper roof C extending beyond this wall, as seen at F, and covering to some extent the roof D in the lower plane. In practice, about eight inches projection is found sufficient. This frontlet or projecting ridge-roof forms a satisfactory shelter or screen for the end ventilators E.

Having described my invention, I claim—

A street-car having above the end sections of the roof an opening for ventilation, or glass or other device for light or signal, or other purpose, and in combination therewith a frontlet or projecting part of the ridge-roof, which frontlet or projection forms a screen, shelter, or protection to the end ventilators, as and for the purposes set forth.

In testimony that I claim the foregoing I have hereunto set my hand this 29th day of April, 1876.

JOHN STEPHENSON.

Witnesses:
STUART A. STEPHENSON,
WILLIAM J. WALKER.